United States Patent
Kim

(10) Patent No.: US 8,855,610 B2
(45) Date of Patent: Oct. 7, 2014

(54) MOBILE COMMUNICATION TERMINAL, METHOD OF GENERATING GROUP PICTURE IN PHONEBOOK THEREOF AND METHOD OF PERFORMING COMMUNICATION EVENT USING GROUP PICTURE

(75) Inventor: Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1932 days.

(21) Appl. No.: 12/013,573

(22) Filed: Jan. 14, 2008

(65) Prior Publication Data

US 2008/0176602 A1 Jul. 24, 2008

(30) Foreign Application Priority Data

Jan. 22, 2007 (KR) .................................. 2007-6450

(51) Int. Cl.
  *H04M 3/42* (2006.01)
  *H04M 1/2745* (2006.01)
(52) U.S. Cl.
  CPC ................................. *H04M 1/27455* (2013.01)
  USPC ...................... 455/414.1; 455/556.1; 382/224; 709/204; 707/104.1; 707/512
(58) Field of Classification Search
  USPC ............. 455/556.1, 456.6; 382/224; 709/204; 707/104.1, 512
  See application file for complete search history.

(56) References Cited

U.S. PATENT DOCUMENTS 5,333,315 A * 7/1994 Saether et al. .......................... 1/1
8,341,219 B1 * 12/2012 Young ............................ 709/204
2002/0055955 A1 * 5/2002 Lloyd-Jones et al. ......... 707/512
2002/0103813 A1 * 8/2002 Frigon ........................ 707/104.1
2004/0126038 A1 * 7/2004 Aublant et al. ................ 382/305
2005/0096084 A1 * 5/2005 Pohja et al. ................. 455/556.1
2006/0030339 A1 * 2/2006 Zhovnirovsky et al. ... 455/456.6
2006/0251338 A1 * 11/2006 Gokturk et al. ............... 382/305
2006/0253491 A1 * 11/2006 Gokturk et al. ............ 707/104.1

(Continued)

FOREIGN PATENT DOCUMENTS

| JP | 2005-217947 A | 8/2005 |
| KR | 10-2005-0071974 A | 7/2005 |
| KR | 10-2006-0053477 A | 5/2006 |
| KR | 10-2006-0056059 A | 5/2006 |

OTHER PUBLICATIONS

Zhang et al.; Face Annotation for Family Photo Album Management, Dec. 30, 2002, World Scientific, All pages.*

*Primary Examiner* — Charles Shedrick
(74) *Attorney, Agent, or Firm* — Jefferson IP Law, LLP

(57) ABSTRACT

A mobile communication terminal for providing a group picture of a group in a phonebook, a method of generating the group picture in the phonebook of the mobile communication terminal and a method of performing a communication event using the group picture are provided. The method of generating a group picture in a phonebook of a mobile communication terminal includes selecting an original picture in which an image corresponding to each member of a group is displayed in a predetermined area corresponding to the group member, mapping an address of each group member to the corresponding predetermined area in the original picture and storing the original picture to which the group members' addresses are mapped as a group picture of the phonebook. The present apparatus and method enable easier editing and use of a group of a phonebook and characteristic decoration thereof which allow for more efficient use of the mobile terminal.

25 Claims, 12 Drawing Sheets

(56) References Cited

U.S. PATENT DOCUMENTS

| | | | |
|---|---|---|---|
| 2008/0278438 A1* | 11/2008 | Brown et al. | 345/156 |
| 2009/0023472 A1* | 1/2009 | Yoo et al. | 455/556.1 |
| 2009/0154677 A1* | 6/2009 | Kunii et al. | 379/142.06 |
| 2009/0324022 A1* | 12/2009 | Sangberg et al. | 382/118 |
| 2010/0054600 A1* | 3/2010 | Anbalagan et al. | 382/180 |
| 2010/0054601 A1* | 3/2010 | Anbalagan et al. | 382/180 |
| 2010/0162171 A1* | 6/2010 | Felt et al. | 715/835 |
| 2010/0322401 A1* | 12/2010 | Ryu | 379/142.06 |
| 2011/0053570 A1* | 3/2011 | Song et al. | 455/414.1 |
| 2011/0237229 A1* | 9/2011 | Shimagaki | 455/414.1 |
| 2011/0319016 A1* | 12/2011 | Gormley et al. | 455/41.1 |

* cited by examiner

FIG. 3
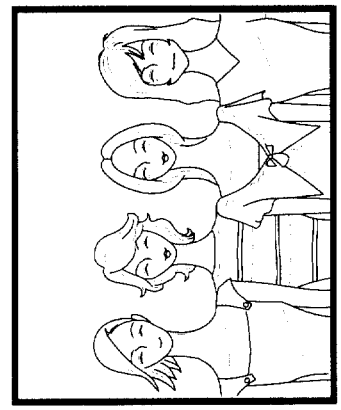
(a)
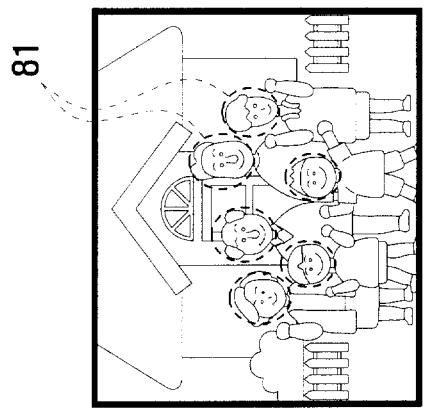
(b)
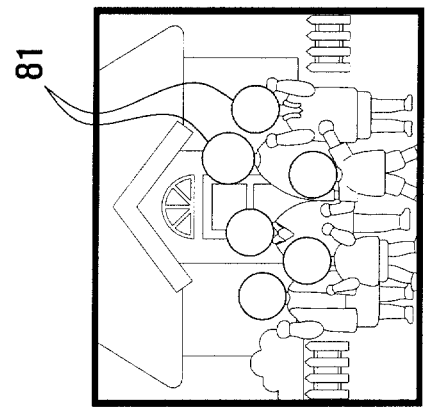
(c)

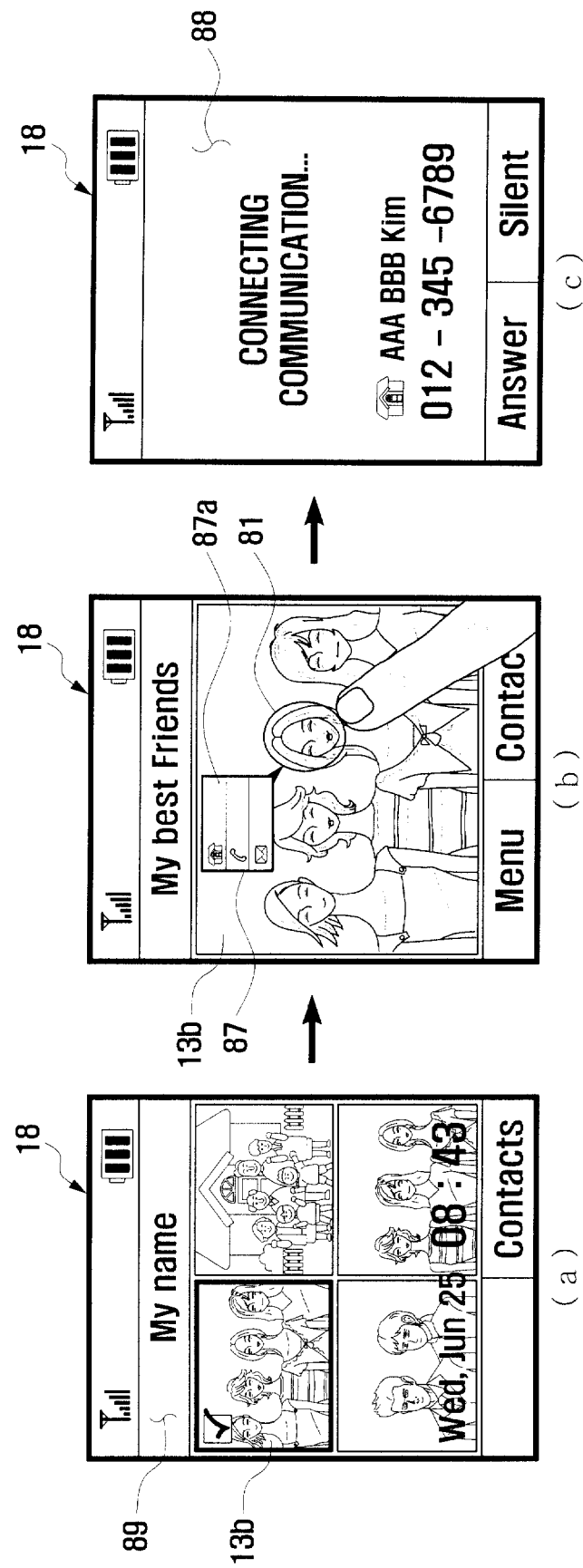

ethods of the Invention

MOBILE COMMUNICATION TERMINAL, METHOD OF GENERATING GROUP PICTURE IN PHONEBOOK THEREOF AND METHOD OF PERFORMING COMMUNICATION EVENT USING GROUP PICTURE

PRIORITY

This application claims the benefit under 35 U.S.C. §119 (a) of a Korean patent application filed in the Korean Intellectual Property Office on Jan. 22, 2007 and assigned Serial No. 2007-0006450, the entire disclosure of which is hereby incorporated by reference.

BACKGROUND OF THE INVENTION

1. Field of the Invention

The present invention relates to a mobile communication terminal and a method of performing a function thereof. More particularly, the present invention relates to a mobile communication terminal for providing a group picture of a group in a phonebook, a method of generating the group picture in the phonebook and a method of performing a communication event using the group picture.

2. Description of the Related Art

With the development of mobile communication technology, a user of a mobile communication terminal is able to perform voice communication almost regardless of time and place. As mobile communication technology further develops, various functions are added to the mobile communication terminal. Such additional functions include the providing of character information, image information, MP3 files, and games to a user through the mobile communication terminal.

Furthermore, the user can store another party's phone number in a phonebook of the mobile communication terminal and phone numbers can be classified into a group according to a relationship with the user. By classifying and grouping the phone numbers, the user can more easily manage the phonebook.

A conventional method in which a user searches for another party's phone number using a group search is described as follows. After a phonebook menu is first selected, a group menu is selected from among displayed lower level menus. Next, a group to which the other party belongs is selected from among the displayed groups and members of the selected group are displayed. The user selects the desired party from the displayed group members and the other party's phone number is determined. In this case, a group and group members are displayed in a list form using text characters.

The above described conventional method is tedious for the user because the group and group members are displayed in a text form. That is, because a mobile communication terminal displays a group and group members in a preset form, it does not enable a user to create a phonebook group in a desired form.

Furthermore, the quantity of group members that can be simultaneously displayed on a screen is limited so that when many group members exist, members belonging to a group cannot be quickly determined. That is, when a group member that is searched for does not exist among group members displayed on the screen, it is inconvenient to search for the group member on a next screen.

SUMMARY OF THE INVENTION

An aspect of the present invention is to address at least the above-mentioned problems and/or disadvantages and to provide at least the advantages described below. Accordingly, an aspect of the present invention is to provide a mobile communication terminal for providing a group of a phonebook with a group picture, a method of generating a group picture in a phonebook of the mobile communication terminal and a method of performing a communication event using the group picture that enable user friendly editing and use of the group of the phonebook and characteristic decoration thereof.

Another aspect of the present invention is to provide a mobile communication terminal for providing a group of a phonebook with a group picture, a method of generating a group picture in a phonebook of the mobile communication terminal and a method of performing a communication event using the group picture in which a user can rapidly visually recognize the group of the phonebook and group members.

In accordance with an aspect of the present invention, a method of generating a group picture in a phonebook of a mobile communication terminal is provided. The method includes selecting an original picture in which an image corresponding to each member of a group is displayed in a predetermined area corresponding to the group member, mapping an address of each of the group members to the corresponding predetermined area of the original picture and storing the original picture to which the group members' addresses are mapped as a group picture in the phonebook.

The method may further include displaying, if a group display menu of the phonebook is selected, the group pictures of the phonebook in the form of a thumbnail image, a group name image and an image in which a thumbnail image and the corresponding group name image are combined.

In accordance with another aspect of the present invention, a method of generating a group picture in a phonebook of a mobile communication terminal is provided. The method includes displaying, when a group setting menu of the phonebook is selected, a group setting item, displaying, if a picture mode is selected from the displayed group setting items, original pictures to be used for setting a group, displaying, if an original picture to be used for setting a group is selected from the displayed original pictures, the selected original picture on a full screen, designating predetermined areas, each including an image corresponding to a member of the group in the selected original picture, inputting, if a designated predetermined area is selected, a group member's address to be mapped to the selected predetermined area on a displayed address input window and storing the original picture to which the group member's address is mapped as a group picture of the phonebook.

In an exemplary implementation, the image corresponding to a group member is one of the group member's face, an animal, a plant, a constellation, and a character image.

In accordance with yet another aspect of the present invention, a method of performing a communication event in a mobile communication terminal using group pictures is provided. The method includes selecting a group display menu of a phonebook and displaying the group pictures, selecting, from the displayed group pictures, a group picture in which a subject of a communication event is displayed and displaying the selected group picture on a full screen and performing, if an image corresponding to the subject is selected from the selected group picture, a communication event to the subject's address.

In an exemplary implementation, the group pictures are displayed in the form of a thumbnail image, a group name image and an image in which a thumbnail image and the corresponding group name image are combined.

In another exemplary implementation, the performing of the communication event to the subject's address includes displaying, if an image corresponding to the subject is selected from the selected group picture, a communication event item based on the subject's address mapped to the selected image, selecting a communication event item from the displayed communication event items and performing the corresponding communication event.

In an exemplary implementation, the communication event item includes at least one of call transmission, text message transmission and e-mail transmission.

In accordance with another aspect of the present invention, a method of performing a communication event in a mobile communication terminal using group pictures is provided. The method includes displaying a group picture on a standby screen, selecting an image corresponding to a subject of a communication event from the displayed group picture and performing the communication event.

In an exemplary implementation, the displaying of the group picture on a standby screen includes displaying at least one group picture on the standby screen, selecting, from the displayed group pictures, a group picture in which a subject of a communication event is displayed and displaying the selected group picture on a full screen.

In another exemplary implementation, the group pictures are displayed in the form of a thumbnail image.

In accordance with yet another aspect of the present invention, a mobile communication terminal is provided. The mobile terminal includes a storage unit for storing a phonebook and original pictures, a controller for mapping an address of each member of a group to a corresponding predetermined area in an original picture selected from the original pictures and for storing the selected original picture to which the group members' addresses are mapped as a group picture of the phonebook in the storage unit, a display unit for displaying a selected group picture among the stored group pictures and a radio frequency (RF) unit for performing, if a predetermined area to which a group member's address is mapped is selected from the displayed group picture, a communication event with the corresponding group member.

In an exemplary implementation, the controller controls the display unit to display the group pictures in the form of a thumbnail image, a group name image and an image in which a thumbnail image and the corresponding group name image are combined.

In yet another exemplary implementation, the controller controls the display unit to display the selected group picture on a standby screen.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3 illustrates an example of an image displayed during an exemplary method of generating a group picture of FIG. 2A;

FIG. 10 illustrates exemplary screens displayed during an exemplary method of performing a communication event of FIG. 9.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
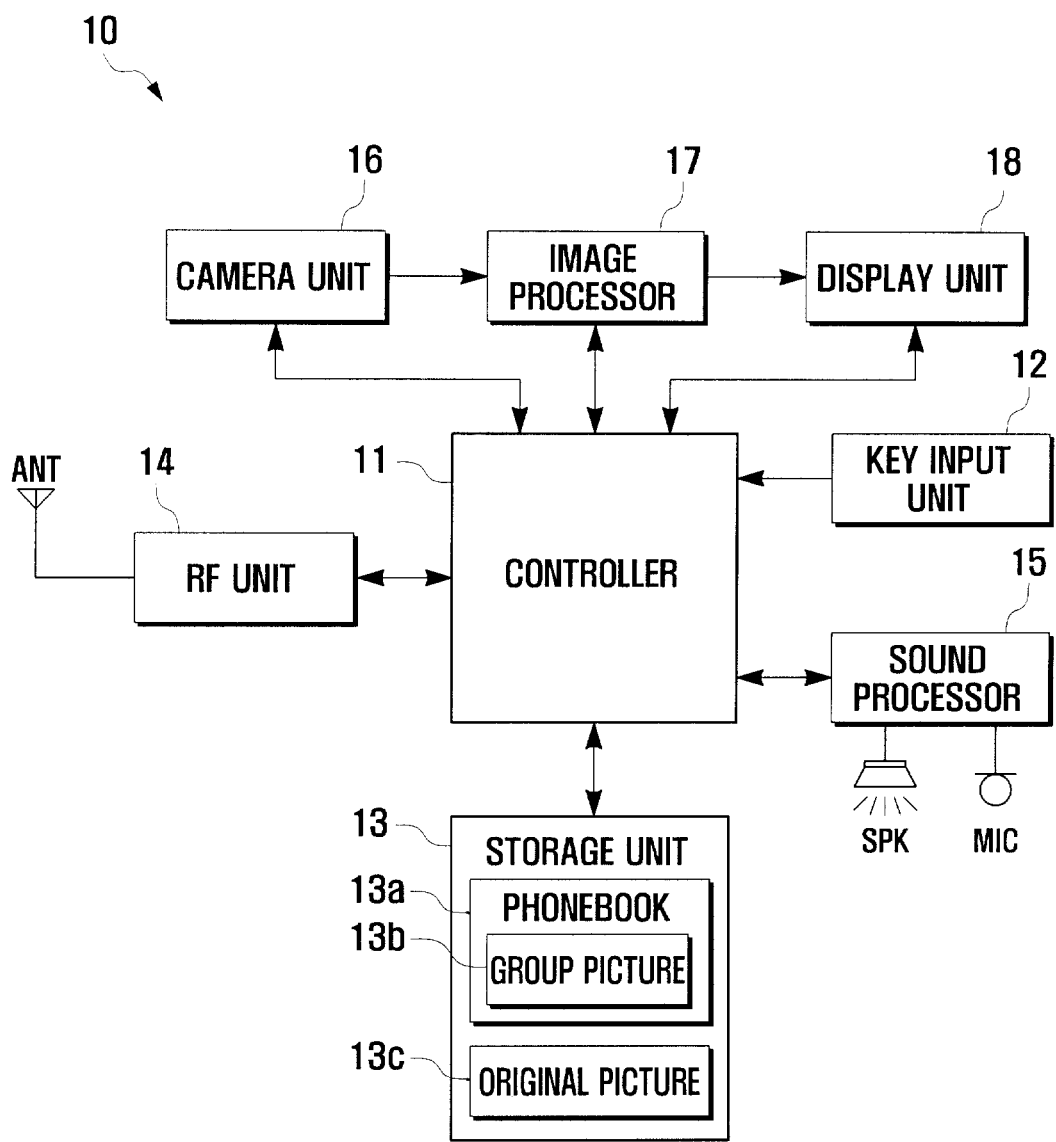
FIG. 1 is a block diagram illustrating a configuration of a mobile communication terminal according to an exemplary embodiment of the present invention.

FIG. 1 is a block diagram illustrating a configuration of a mobile communication terminal according to an exemplary embodiment of the present invention.

Referring to FIG. 1, the mobile communication terminal 10 includes a controller 11, a key input unit 12, a storage unit 13, an RF unit 14, a sound processor 15, a camera unit 16, an image processor 17 and a display unit 18.

The controller 11 performs general control operations of the mobile communication terminal 10. For example, the controller 11 controls to generate a group picture 13b of a phonebook 13a and to perform a communication event.

The key input unit 12 provides a plurality of keys for manipulating the mobile communication terminal 10, generates key data according to key selection by a user and outputs the generated key data to the controller 11. The key input unit 12 may be a key pad, a touch pad and the like.

The storage unit 13 stores a program or programs required for controlling operations of the mobile communication terminal 10 and stores data generated while performing a program. The storage unit 13 stores a program for generating the group picture 13b as well as data generated while performing the program. The storage unit 13 stores an original picture 13c and a phonebook 13a including a group picture 13b generated using the original picture 13c. The phonebook 13a stores addresses of communication event subjects input by the user and an address of a subject is classified into a group and stored. A group list can be displayed with a text or a group picture 13b. The subject's address may include a phone number, an e-mail address of the subject, a name matched to the phone number and the like.

The RF unit 14 performs a communication event through an antenna ANT by the control of controller 11. The communication event may include call reception and transmission, message reception and transmission, e-mail reception and transmission and the like.

The sound processor 15 digitalizes a voice input to a microphone MIC by the control of controller 11, demodulates voice data received through the RF unit 14, and outputs the demodulated voice data through a speaker SPK.

The camera unit 16 photographs an image and generates image data using the photographed image. That is, the camera unit 16 photographs an image according to a photographing mode selected through the key input unit 12 and generates image data using the photographed image. The camera unit 16 may include an image sensor for converting an optical signal of a subject to an analog signal and a signal processor for converting the analog signal to a digital signal.

The image processor 17 processes image data generated in the camera unit 16 according to a specification of the display unit 18 and outputs the processed image data to the display unit 18. The image processor 17 edits the generated image data by the control of controller 11.

The display unit 18 displays various function menus executed in the mobile communication terminal 10 and data stored in the storage unit 13 with an image on a screen. The display unit 18 displays an image of a preview state output from the image processor 17, an original picture 13c and a group picture 13b stored in the storage unit 13 and a document or data according to execution of a file viewer. In an exemplary implementation, the display unit 18 may use a Liquid Crystal Display (LCD), which may incorporate a touch screen. The touch screen may simultaneously perform a function of a display means and an input means.

As will be described in more detail below, the controller 11 maps a group member's address to a predetermined area in a selected original picture 13c and stores the selected original picture 13c, to which the group members' addresses are mapped, as a group picture 13b in the phonebook 13a. An image matched to a group member is displayed in a predetermined area to which the group member's address is mapped.

The controller 11 controls the display unit 18 to display a group picture selected from a group display menu of the phonebook 13a using one of a thumbnail image, a group name image, and an image in which a thumbnail image and the corresponding group name image are combined. The controller 11 controls the display unit 18 to display at least one group picture 13b selected by the user on a standby screen.

When a predetermined area, to which a group member's address is mapped, is selected from the group picture 13b by user touch for example, the RF unit 14 performs a communication event with the selected group member by the control of controller 11. The communication event may be call transmission, text message transmission, e-mail transmission and the like.

In an exemplary embodiment, input of a selection signal by the user is performed through touch of the display unit 18 and key selection of the key input unit 12. However, input of a selection signal by the user is not limited thereto. For example, when the display unit 18 is an LCD without a touch screen, input of a selection signal by the user may be performed through the key input unit 12.

Figure 2A:
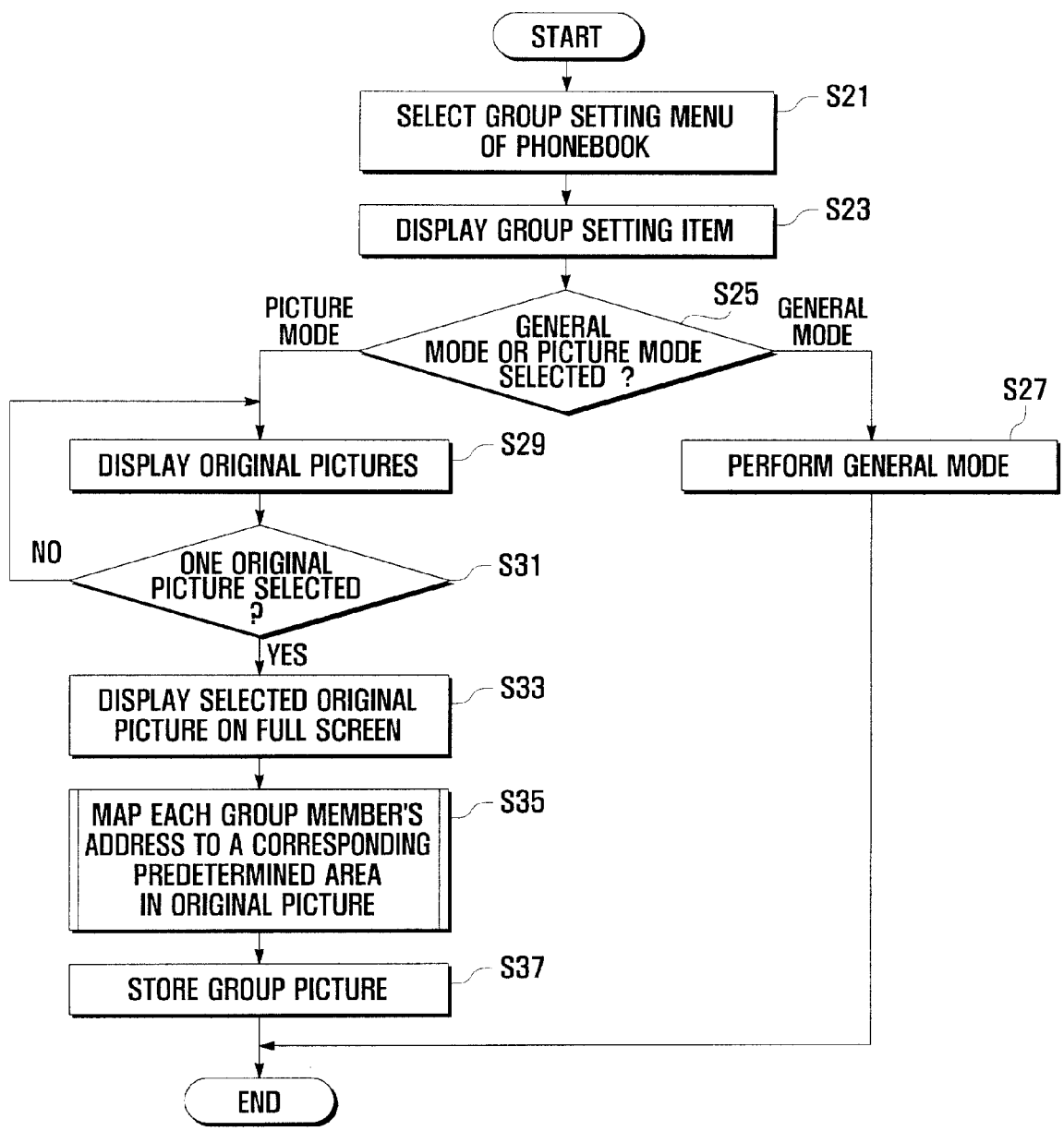
FIG. 2A is a flowchart illustrating a method of generating a group picture in a phonebook of a mobile communication terminal according to an exemplary embodiment of the present invention.
Figure 2B:
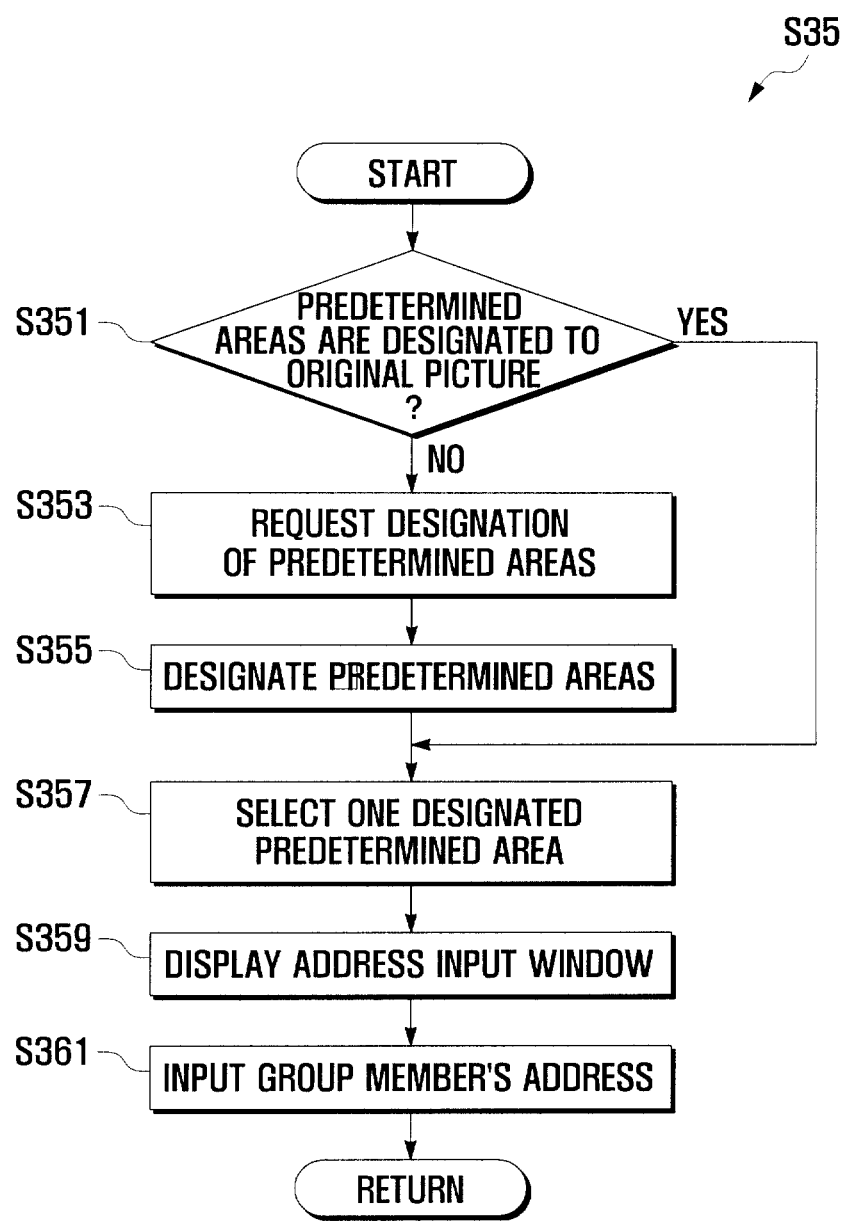
FIG. 2B is a flowchart illustrating an exemplary mapping process in the method of FIG. 2A.

FIG. 2A is a flowchart illustrating a method of generating a group picture in a phonebook of a mobile communication terminal according to an exemplary embodiment of the present invention. FIG. 2B is a flowchart illustrating an exemplary mapping process in the method of FIG. 2A. FIG. 3 illustrates examples of original pictures that may be used in the method of generating a group picture of FIG. 2A.

Referring to FIGS. 1 to 3, when a group setting menu of the phonebook 13a is selected by a selection signal of the user in step S21, the controller 11 controls the display unit 18 to display group setting items in the group setting menu in step S23. The group setting items include a general mode and a picture mode for setting a group.

The controller 11 determines whether the general mode or the picture mode for setting a group is selected by a selection signal of the user in step S25. If the general mode for setting a group is selected by the user, the controller 11 performs the general mode for setting a group in step S27. In an exemplary embodiment, the general mode is performed similarly to a known method of setting a group and therefore a detailed description thereof is omitted.

If the picture mode for setting a group is selected by the user, the controller 11 controls to display original pictures to be used for setting a group in step S29. In exemplary embodiments, the original pictures may be displayed in the display unit 18 in certain quantities of pictures or one by one in a thumbnail image form.

The controller 11 determines whether one of the original pictures is selected by the user in step S31. If one of the original pictures is selected by the user, the controller 11 controls to display the selected original picture 13c on a full screen in step S33. If one of the original pictures is not selected by the user, the process returns to step S29 and the controller 11 awaits selection by the user.

In step S35, the controller 11 maps each group member's address to a predetermined corresponding area 81 in the selected original picture 13c by a selection signal of the user.

The controller 11 stores the group picture 13b generated thereby in step S37.

The mapping process of step S35 is described in more detail below.

The controller 11 stores the original picture 13c, to which group members' addresses are mapped, as the group picture 13b in the phonebook 13a. In an exemplary implementation, the controller 11 may store a group name of the group picture 13b which may be designated by key input of the user.

An exemplary mapping process of step S35 that may be used as a method of generating the group picture 13b is described in detail as follows.

Referring to FIGS. 2B and 3, the controller 11 determines whether predetermined areas 81 are designated in the selected original picture 13c in step S351. In an exemplary implementation, the original picture 13c may be one of an actual picture in which each group member's face is displayed (e.g. picture (a) in FIG. 3), a character picture in which a character image corresponding to each group member is displayed (e.g. picture (b) in FIG. 3) and a composite picture combining each group member's face with a character image corresponding to the group member (e.g. picture (c) in FIG. 3). Here, the actual picture (a) is generally a picture in which the predetermined areas 81 are not designated and may be a picture photographed or downloaded by the user. The character picture (b) and the composite picture (c) are pictures in which the predetermined areas 81 are predesignated, and are pictures that are provided or downloaded during manufacture of the mobile communication terminal or at a later time. The predetermined areas 81 in the composite picture (c) are empty and a face or a character image matched to a group member can be composed in each predetermined area 81 by a selection signal of the user.

The original picture 13c is not limited thereto. Also, the original picture 13c may be a picture in which the predetermined areas 81 are designated to an actual picture and are not designated to character pictures and composite pictures. Therefore, the controller 11 must determine whether predetermined areas 81 are designated to the selected original picture 13c at step S351.

The original image used as the group picture 13b includes an image corresponding to each group member. The image corresponding to a group member may be a figure representing the group member and an area including the group member's face can be designated as the group member's predetermined area 81. As other images, various characters such as animals, plants, constellations and the like corresponding to the group members may be used.

If predetermined areas 81 are not designated to the selected original picture 13c at step S351, the controller 11 requests the user to designate the predetermined areas through the display unit 18 in step S353. For example, the controller 11 may control to display a pop-up window including a message for requesting designation of predetermined areas on the selected original picture 13c.

The predetermined areas 81, each including an image corresponding to a group member in the selected original picture 13c, are designated by the user in step S355. The predetermined area 81 can be designated in various ways. For example, if the display unit 18 includes a touch screen, each predetermined area 81 can be designated by touch. Or, the predetermined areas 81 may be designated by manipulating the key input unit 12 or by designating a figure (for example, various shapes such as a circle, oval, crescent, triangle, quadrangle, and constellation) in a position to be designated as the predetermined area 81.

After the predetermined areas 81 corresponding to group members are designated to the selected original picture 13c, when the user selects one of the designated predetermined areas 81 in step S357, the controller 11 controls to display an address input window around or otherwise nearby the selected predetermined area 81 in step S359.

If a predetermined area 81 is already designated for the selected original picture 13c at step S351, the process continues at step S357.

A group member's address to be mapped to the selected predetermined area 81 is input to the address input window by input of the user in step S361. The group member's address may include a phone number, an e-mail address or other data of the group member. The phone number is a phone number that can be used to perform communication or to send and receive a text message with the mobile communication terminal 10 of the user.

Figure 4A:
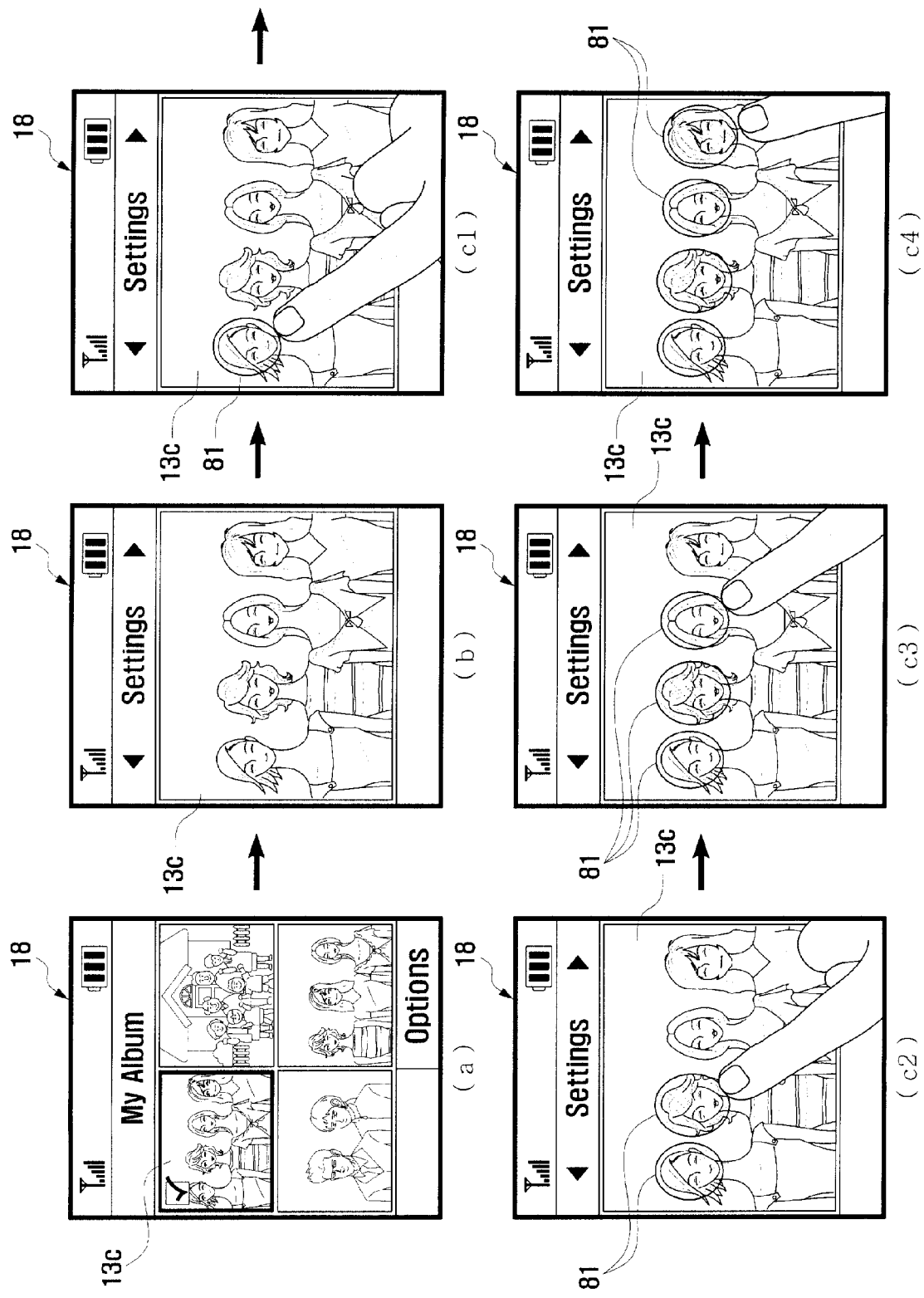
FIGS. 4A and 4B illustrate exemplary screens displayed during an exemplary method of generating a group picture of FIG. 2A.
Figure 4B:
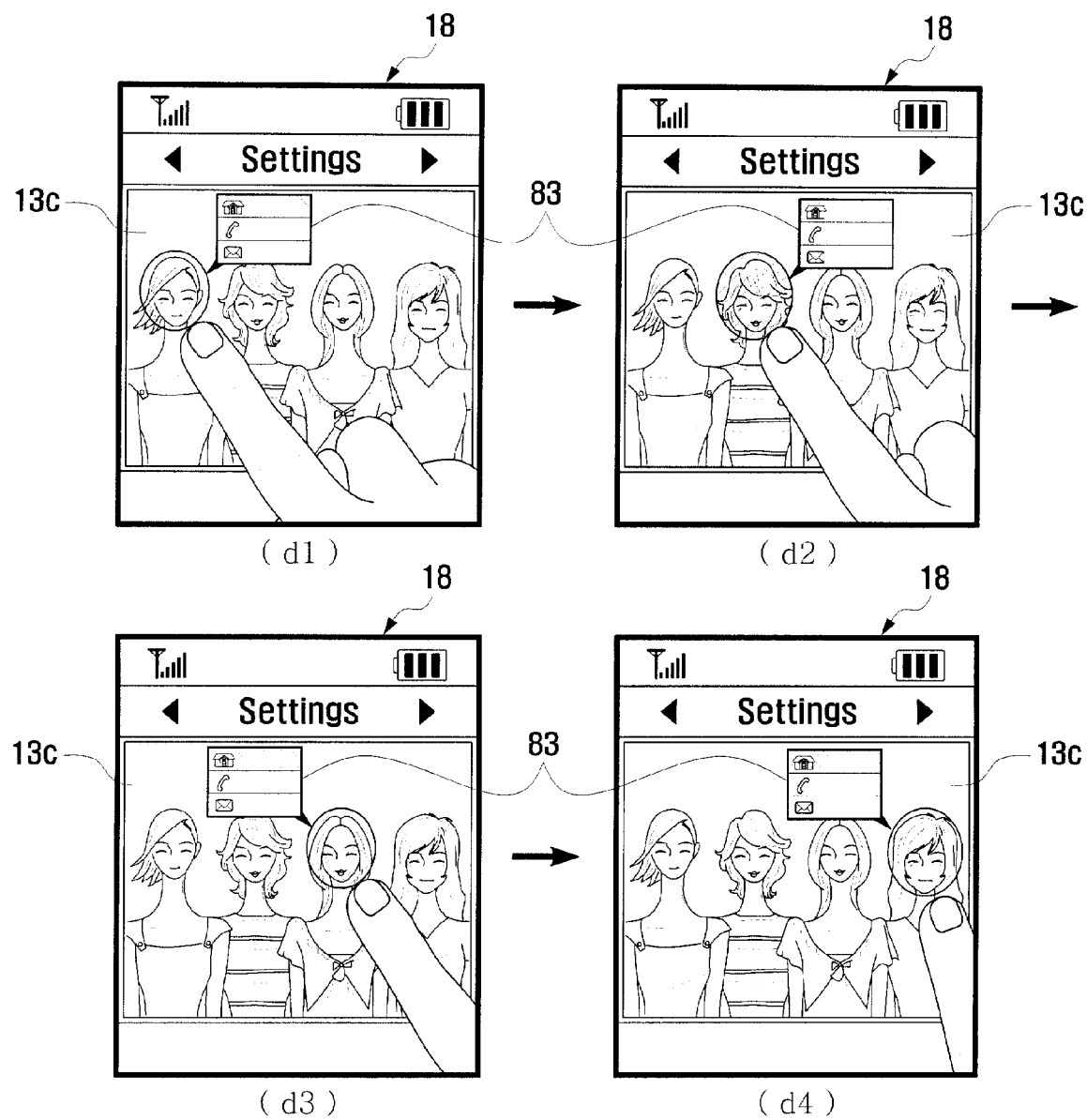

FIGS. 4A and 4B illustrate exemplary screens displayed during an exemplary method of generating the group picture 13b using an original picture 13c in which a predetermined area 81 is not designated. If the user selects a picture mode, the display unit 18 displays original pictures in a thumbnail form, as shown in screen (a) of FIG. 4A.

When the user selects the original picture 13c from among the displayed original pictures in screen (a) in which predetermined areas 81 are not designated, the selected original picture 13c is displayed on a full screen as shown in screen (b) of FIG. 4A.

When an image corresponding to a group member is selected, for example by touch of the user, as shown in screens (c1) to (c4) of FIG. 4A, the controller 11 designates the selected image as a predetermined area 81 to which the group member's address is to be mapped. While the selection of the group member is illustrated by touch input of the user, the selection may also be made by key manipulation or another manner. In the example, the members' images are sequentially designated as the predetermined area 81 from left to right. However the members' images can be designated as the predetermined area 81 in any sequence. Further, in the example a face is designated as the predetermined area 81. However other body parts may be designated as the predetermined area 81.

When a predetermined area 81 is selected by touch of the user, as shown in screens (d1) to (d4) of FIG. 4B, the controller 11 controls to display an address input window 83 associated with the selected predetermined area 81. The group members' addresses may be input in the address input window 83 by key input of the user. In the example, the group members' addresses are sequentially input to the address input window 83 from left to right in the predetermined areas 81. However the group members' addresses can be input by selecting the predetermined areas 81 in any sequence.

In an exemplary embodiment, each group member's address is mapped individually to the corresponding predetermined area 81. However, another predetermined area for mapping addresses of all group members may also be designated. That is, the predetermined area may include a plurality of first predetermined areas 81 to which each group member's address is individually mapped and a second predetermined area for mapping all group members' addresses mapped to the first predetermined areas 81. The second predetermined area can be used when performing a group communication event, for example when transmitting a text message or an e-mail by selecting the addresses of all group members belonging to a group.

A method of performing a communication event using a group picture 13b generated according to an exemplary embodiment may be performed using a phonebook 13a or a standby screen, as shown in FIGS. 5 to 10.

An exemplary method of performing a communication event using a phonebook 13a is described as follows.

Figure 5:
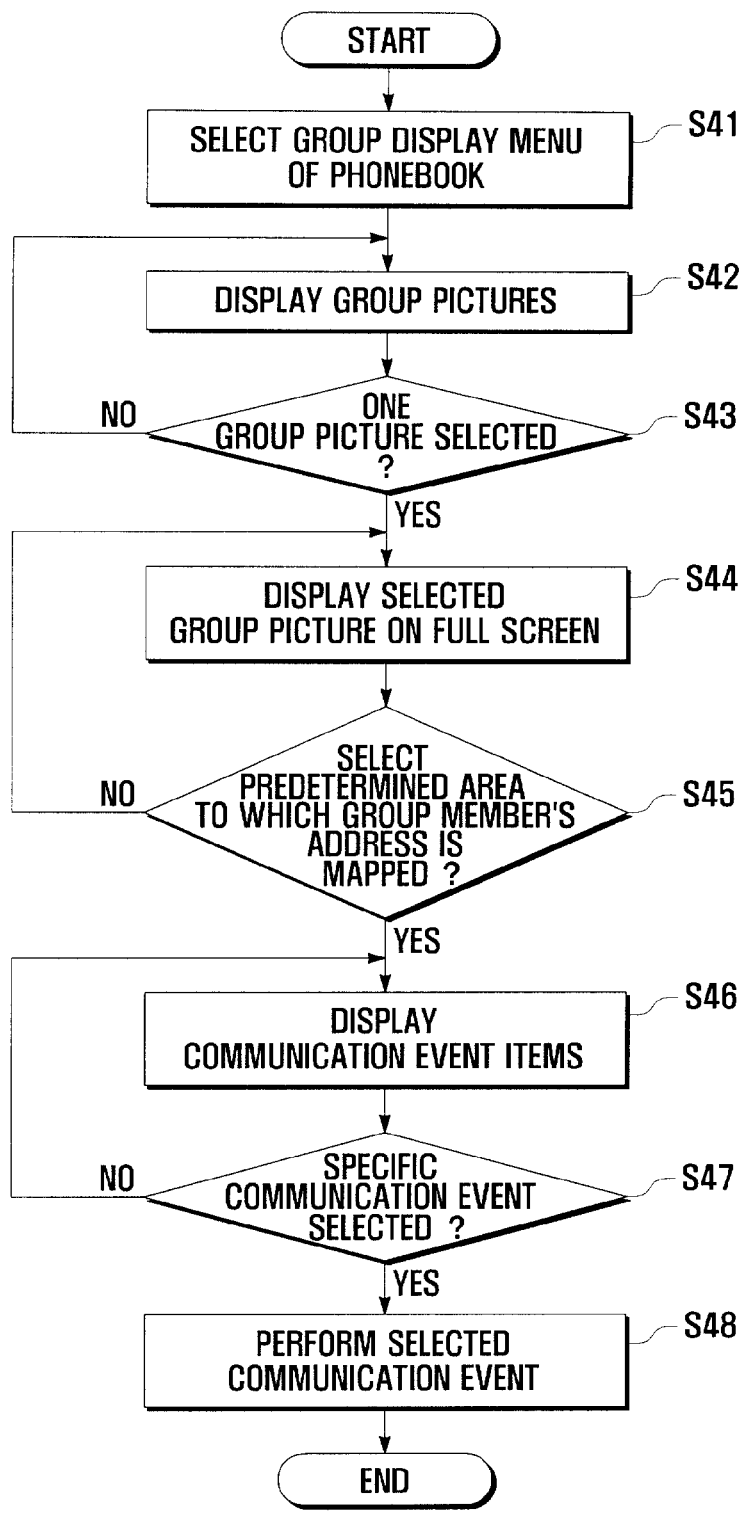
FIG. 5 is a flowchart illustrating an exemplary method of performing a communication event using a group picture generated according to the method of FIG. 2A.
Figure 6:
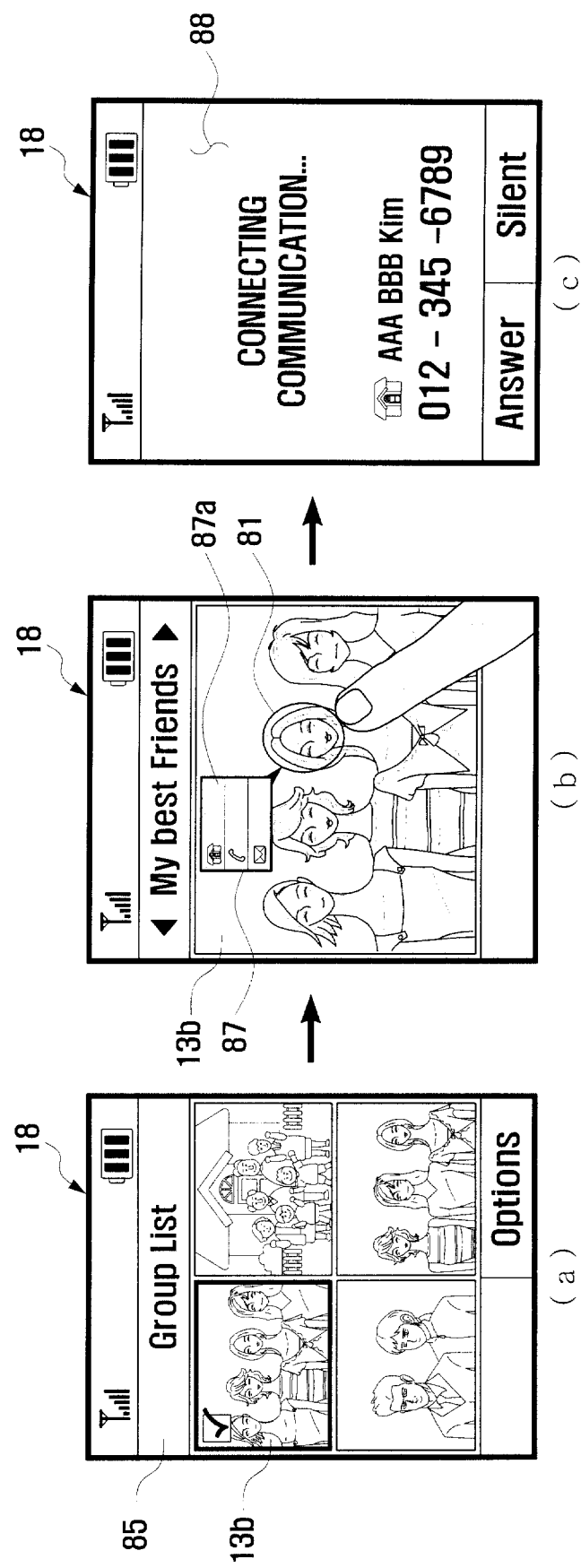
FIG. 6 illustrates exemplary display screens displayed during an exemplary method of performing a communication event of FIG. 5.

FIG. 5 is a flowchart illustrating a method of performing a communication event using the group picture 13b generated according to an exemplary method of FIG. 2A. FIG. 6 illustrates exemplary screens displayed in the method of performing a communication event of FIG. 5.

Referring to FIGS. 1, 5 and 6, when a group display menu of the phonebook 13a is selected by a selection signal of the user in step S41, the controller 11 controls the display unit 18 to display the group pictures in step S42. That is, the controller 11 displays a group list 85 in the form of group pictures instead of text. In this case, the group picture is displayed in a thumbnail form, as shown in screen (a) of FIG. 6. In an exemplary embodiment as illustrated in screen (a) of FIG. 6, the group pictures are displayed in a thumbnail form. However, the group pictures may be displayed in a group name image or an image in which a thumbnail image and the corresponding group name image are combined. In an exemplary implementation, the group name image is displayed as text.

The controller 11 determines whether the user selects one of the group pictures, in which a subject of a communication event is included as a group member, from the group pictures in step S43. If the user selects one of the group pictures, the controller 11 controls to display the selected group picture 13b on a full screen in step S44. For example, screen (b) of FIG. 6 illustrates an example in which a group of friends (My best Friends) is selected as the group picture 13b.

The controller 11 determines whether an image corresponding to the subject is selected from the selected group picture 13b, for example by touch of the user to the predetermined area 81 to which the group member's address is mapped in step S45. If an image corresponding to the subject is selected from the predetermined area 81 to which the group member's address is mapped by touch of the user, the controller 11 controls to display communication event items 87 based on the subject's address mapped to the selected predetermined area 81 in step S46. If an image corresponding to the subject is not selected from the selected group picture 13b by touch of the user to the predetermined area 81 to which the group member's address is mapped, the process returns to step S44.

The controller 11 determines whether a specific communication event 87a from among the displayed communication event items 87 is selected by touch of the user in step S47. If a specific communication event 87a among the displayed communication event items 87 is selected by touch of the user, the controller 11 performs the selected communication event 87a in step S48. For example, if a home phone icon 87a is selected from the communication event items 87 shown in screen (b) of FIG. 6, the controller 11 performs call transmission to a home phone number (012-345-6789) of a subject (AAA BBB Kim) mapped to the predetermined area 81, as shown in screen (c) of FIG. 6. Screen (c) displays a communication connection screen 88 notifying of a call transmission.

If a mobile phone icon is selected on screen (b) of FIG. 6, the controller 11 performs call transmission to a phone number of a mobile communication terminal of the selected subject mapped to the predetermined area 81. If an envelope icon is selected, the controller 11 transmits a text message to a phone number of the selected subject mapped to the predetermined area 81.

In an exemplary embodiment, a communication event is performed with a specific group member as a subject. However, a communication event can be performed with a plurality of group members as subjects displayed in the group picture 13b by a selection signal of the user. In this case, the communication event is text message transmission or e-mail transmission.

Further, methods of performing a communication event using a standby screen are described as follows. In the first method, a case in which a group picture 13b is displayed on a standby screen is described, and in the second method, a case in which a plurality of group pictures are displayed on a standby screen is divided.

Figure 7:
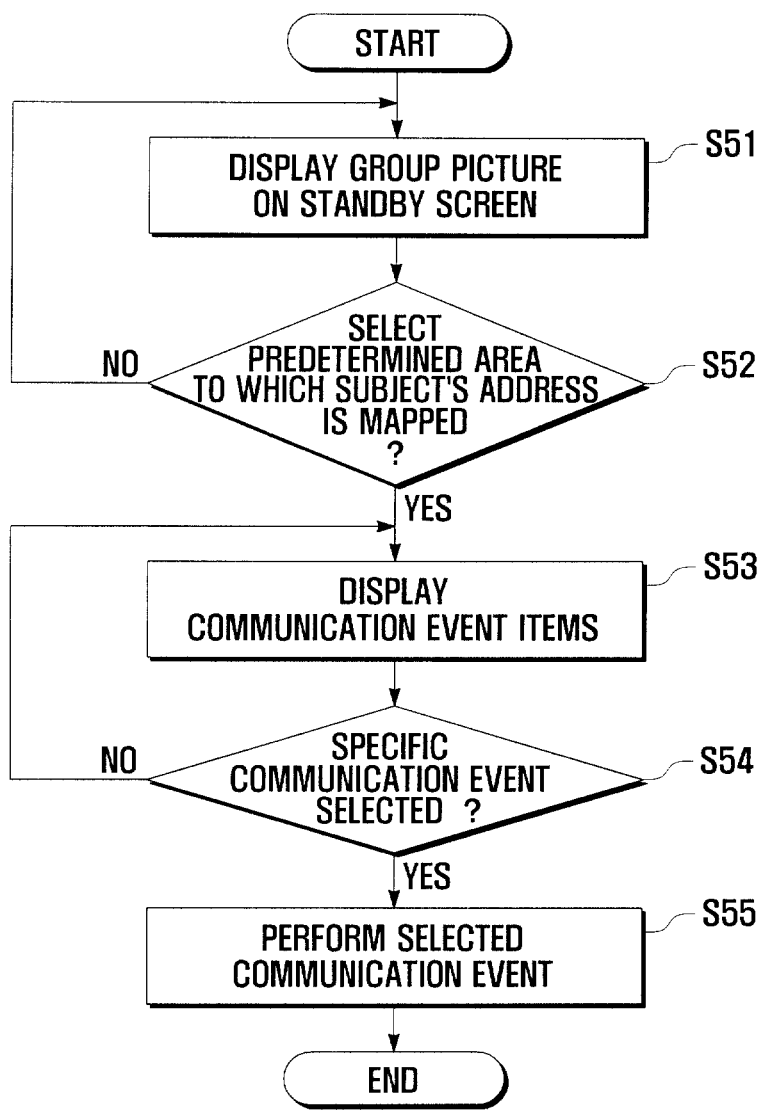
FIG. 7 is a flowchart illustrating another exemplary method of performing a communication event using a group picture generated according to an exemplary method of FIG. 2A.
Figure 8:
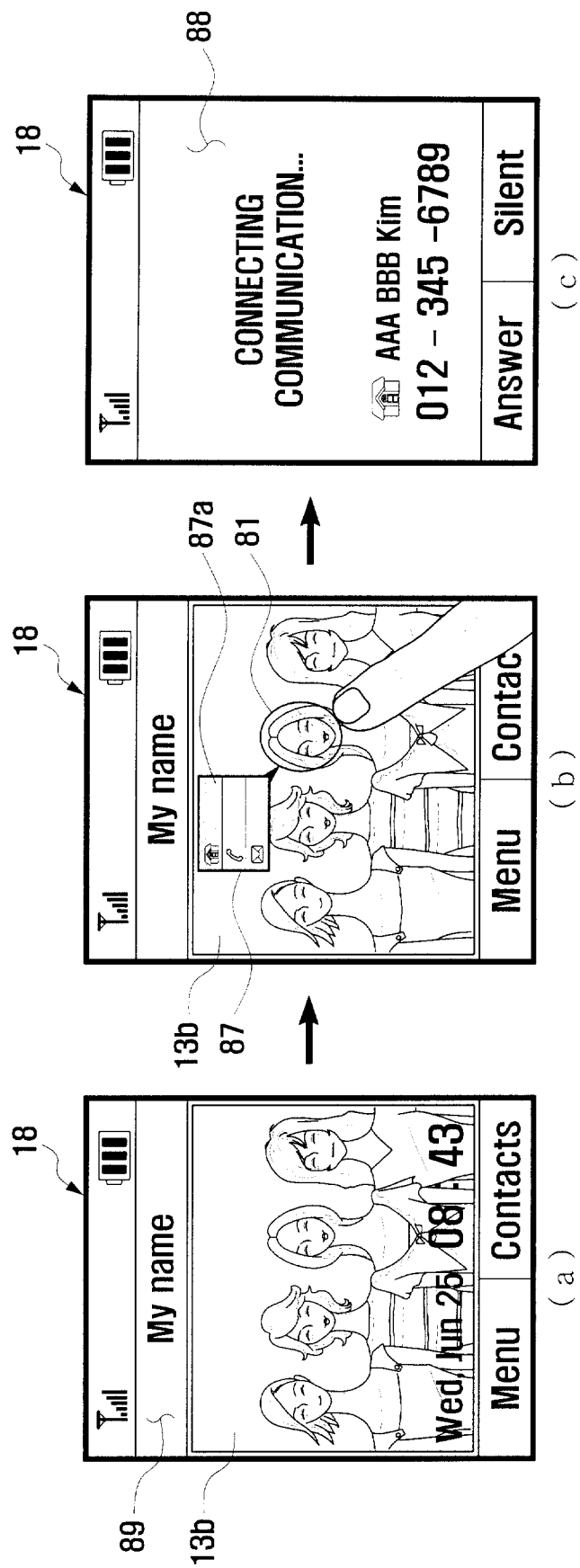
FIG. 8 illustrates exemplary screens displayed during an exemplary method of performing a communication event of FIG. 7.

FIG. 7 is a flowchart illustrating another exemplary method of performing a communication event using a group picture generated according to the method of FIG. 2A. FIG. 8 illustrates exemplary screens displayed in the method of performing a communication event of FIG. 7.

Referring to FIGS. 1, 7, and 8, a method of performing a communication event when a group picture 13b is displayed on a standby screen is described as follows.

The controller 11 controls to display a group picture 13b selected by the user on a standby screen 89 in step S51, as shown in screen (a) of FIG. 8.

The controller 11 determines whether a subject image is selected from the displayed group picture 13b by touch of the user to the predetermined area 81 to which the subject's address is mapped in step S52. If a subject image is selected from the displayed group picture 13b by touch of the user to the predetermined area 81, the controller 11 controls to display the communication event items 87 based on the subject's address mapped to the selected subject in the predetermined area 81 in step S53, as shown in screen (b) of FIG. 8. If a subject image is not selected from the displayed group picture 13b by touch of the user to the predetermined area 81 to which the subject's address is mapped, the process returns to step S51.

The controller 11 determines whether a specific communication event 87a among the displayed communication event items 87 is selected by touch of the user in step S54. If a specific communication event 87a among the displayed communication event items 87 is selected by touch of the user in step S54, the controller 11 performs the selected communication event 87a in step S55, as shown in screen (c) of FIG. 8. Screen (c) displays a communication connection screen 88 notifying call transmission.

Figure 9:
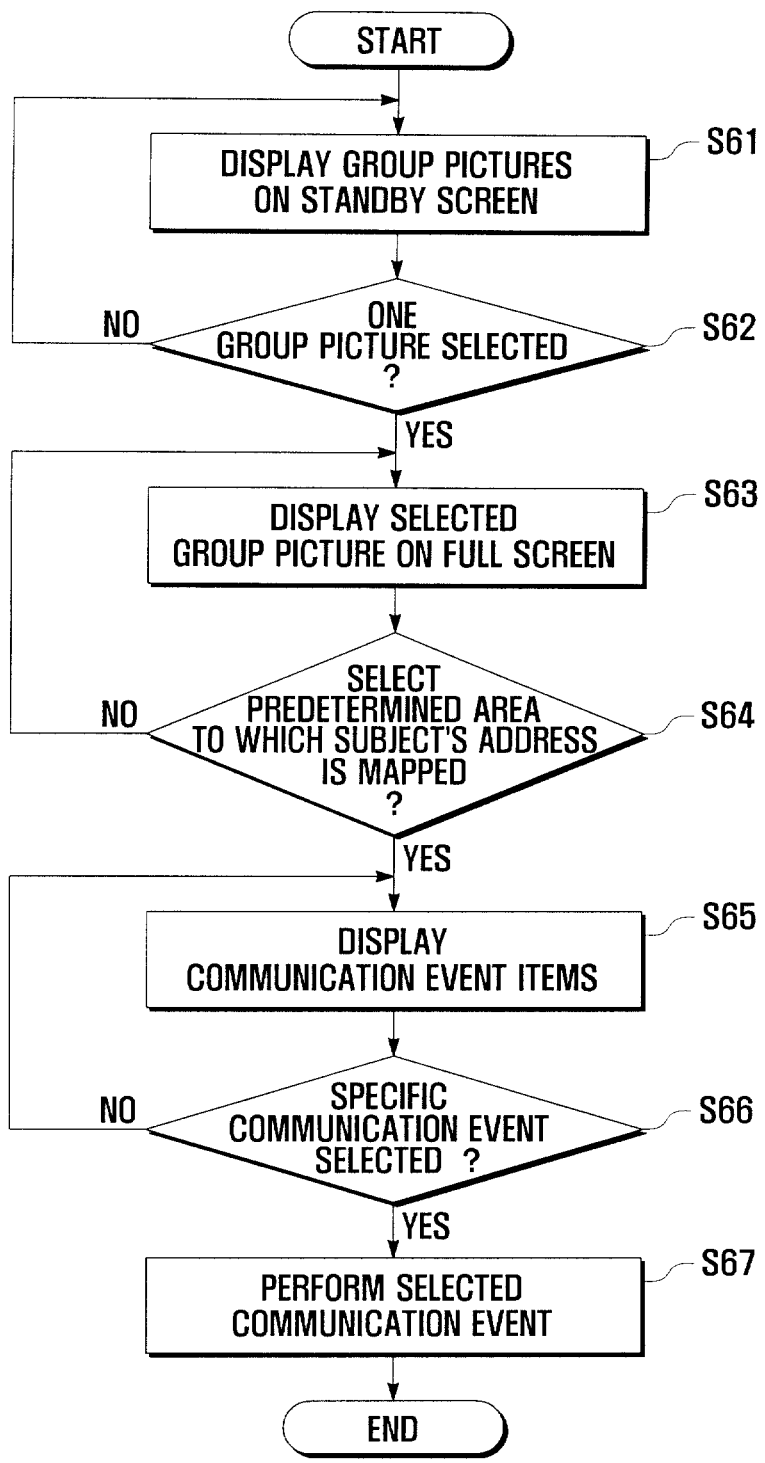
FIG. 9 is a flowchart illustrating another exemplary method of performing a communication event using a group picture generated according to an exemplary method of FIG. 2A.

FIG. 9 is a flowchart illustrating another exemplary method of performing a communication event using a plurality of pictures generated according to the method of FIG. 2A. FIG. 10 illustrates exemplary screens displayed in the method of performing a communication event of FIG. 9.

Referring to FIGS. 1, 9, and 10, an exemplary method of performing a communication event when a plurality of group pictures is displayed on a standby screen is described.

The controller 11 controls to display a plurality of group pictures 13b selected by the user on a standby screen 89 in step S61, as shown in screen (a) of FIG. 10. In screen (a), the group pictures are displayed in the display unit 18 in a thumbnail form.

The controller 11 determines whether the user selects one of the group pictures, in which a subject of a communication event is included as a group member, from the displayed group pictures in step S62. If the user selects one of group pictures 13b, the controller 11 controls to display the selected group picture 13b on a full screen in step S63, as shown in screen (b) of FIG. 10.

The controller 11 determines whether an image corresponding to the subject is selected from the selected group picture 13b by touch of the user to the predetermined area 81 to which the subject's address is mapped in step S64. If an image corresponding to the subject is selected from the selected group picture 13b by touch of the user to the predetermined area 81 to which the subject's address is mapped, the controller 11 controls to display the communication event items 87 based on the subject's address mapped to the selected predetermined area 81 in step S65, as shown in screen (b) of FIG. 10. If an image corresponding to the subject is not selected from the selected group picture 13b by touch of the user to the predetermined area 81 in which the subject's address is mapped, the process returns to step S63.

The controller 11 determines whether a specific communication event 87a among the displayed communication event items 87 is selected by touch of the user in step S66. If a specific communication event 87a among the displayed communication event items 87 is selected by touch of the user, the controller 11 performs the selected communication event 87a in step S67, as shown in screen (c) of FIG. 10. Screen (c) displays a communication connection screen 88 notifying call transmission.

A method of performing a communication event using the phonebook 13a is almost identical to the method of performing a communication event when at least one group picture 13b is displayed on the standby screen 89. The difference between the two methods is that, whereas the standby screen 89 displays only at least one group picture 13b selected by the user, a group display menu of the phonebook 13a displays all group pictures 13b. Therefore, at least one group picture 13b having a subject group member with whom the user frequently performs a communication event may be displayed on the standby screen 89, whereby the user can rapidly perform a communication event with the subject through the standby screen 89.

In an exemplary embodiment, a communication event is performed using a group picture displayed in a phonebook or a standby screen. However, the communication event is not limited thereto. For example, by inputting a group name of a group picture to search in a search mode and searching for the corresponding group picture, a communication event can be performed.

As described above, according to exemplary embodiments of the present invention, by selecting an original picture to be matched to a group of a phonebook, mapping predetermined areas of the selected original picture to group members' addresses, and displaying a group of a phonebook with a generated group picture, a user can conveniently edit and use a group of the phonebook. Accordingly, the user can create a phonebook in a desired form.

The user can determine a group of a phonebook and members of the group more rapidly by visually using a group picture than by using a list form displayed with text.

By selecting a predetermined area of a group picture mapped to a group member's address, a communication event can directly be performed with the selected group member. Further, by selecting a plurality of group members displayed in a group picture, a text message or an e-mail can be rapidly transmitted in a bundle.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method of generating a group picture in a phonebook of a mobile communication terminal, the method comprising:
    selecting an original picture in which an image corresponding to each member of a group is displayed in a predetermined area corresponding to the group member;
    mapping an address of each group member to the corresponding predetermined area in the original picture; and
    generating a group picture by storing the original picture to which the group members' addresses are mapped as a group picture in the phonebook.

2. The method of claim 1, wherein the original picture comprises at least one of an actual picture in which each group member's face is displayed, a character picture in which a character image corresponding to each group member is displayed and a composite picture in which each group member's face is composed to a character image corresponding to the group member.

3. The method of claim 1, further comprising designating the predetermined area of the original picture by user selection.

4. The method of claim 1, wherein the original picture comprises predesignated predetermined areas.

5. The method of claim 2, wherein the character picture and the composite picture each comprise at least one predesignated predetermined area.

6. The method of claim 1, wherein the predetermined area comprises a plurality of first predetermined areas to each of which a group member's address is respectively mapped, and a second predetermined area to which all of the group members' addresses mapped to the first predetermined area are mapped.

7. The method of claim 1, wherein the mapping of the address of each group member to the corresponding predetermined area in the original picture comprises:
    selecting a predetermined area in the original picture; and
    inputting, to a displayed address input window, a group member's address to be mapped to the selected predetermined area.

8. The method of claim 2, wherein the storing of the original picture to which the group members' addresses are mapped as the group picture of the phonebook comprises inputting and storing a group name of the group picture.

9. The method of claim 8, further comprising displaying, if a group display menu of the phonebook is selected, the group pictures of the phonebook as one of a thumbnail image, a group name image, and an image in which a thumbnail image and the corresponding group name image are combined.

10. A method of generating a group picture in a phonebook of a mobile communication terminal, comprising:
    displaying, when a group setting menu of the phonebook is selected, a group setting item;
    displaying, if a picture mode is selected from the displayed group setting item, original pictures to be used for setting a group;
    displaying, if an original picture to be used for setting a group is selected from the displayed original pictures, the selected original picture on a full screen;
    designating predetermined areas, each comprising an image corresponding to each member of the group in the selected original picture;
    inputting, if a designated predetermined area is selected, a group member's address to be mapped to the selected predetermined area on a displayed address input window; and
    generating a group picture by storing the original picture to which the group member's address is mapped as a group picture in the phonebook.

11. The method of claim 10, wherein the designated predetermined areas are separated from each other.

12. The method of claim 10, wherein the image corresponding to each group member comprises at least one of the group member's face, an animal, a plant, a constellation and a character image.

13. The method of claim 10, wherein the storing of the original picture to which the group member's address is mapped as a group picture of the phonebook comprises inputting and storing a group name of the group picture.

14. The method of claim 13, further comprising displaying, if a group display menu of the phonebook is selected, the group pictures of the phonebook in the form of a thumbnail image, a group name image, and an image in which a thumbnail image and the corresponding group name image are combined.

15. A method of performing a communication event in a mobile communication terminal using group pictures generated with the method of claim 1, the method comprising:
    selecting a group display menu of a phonebook and displaying the group pictures;
    selecting, from the displayed group pictures, a group picture in which a subject of a communication event is included, and displaying the selected group picture on a full screen; and
    performing, if an image corresponding to the subject is selected from the selected group picture, a communication event to the subject's address.

16. The method of claim 15, wherein the displaying of the group pictures comprises displaying at least one of a thumbnail image, a group name image, and an image in which a thumbnail image and the corresponding group name image are combined.

17. The method of claim 15, wherein the performing of the communication event with the subject comprises:
   displaying, if an image corresponding to the subject is selected from the selected group picture, a communication event item based on the subject's address mapped to the selected image;
   selecting a communication event item from the displayed communication event items; and
   performing the corresponding communication event.

18. The method of claim 17, wherein the communication event item comprises at least one of a call transmission, a text message transmission, and an e-mail transmission.

19. A method of performing a communication event in a mobile communication terminal using group pictures generated with the method of claim 1, comprising:
   displaying a group picture on a standby screen; and
   performing, if an image corresponding to a subject of a communication event is selected from the displayed group picture, the communication event.

20. The method of claim 19, wherein the displaying of the group picture on a standby screen comprises:
   displaying a plurality of group pictures on the standby screen;
   selecting, from the displayed group pictures, a group picture in which a subject of a communication event is displayed; and
   displaying the selected group picture on a full screen.

21. The method of claim 20, wherein each of the plurality of group pictures is displayed in the form of a thumbnail image.

22. The method of claim 19, wherein the performing of the communication event comprises:
   displaying, if the image corresponding to the subject of the communication event is selected from the displayed group picture, communication event items for communication based on the subject's address mapped to the selected image;
   selecting a communication event from the displayed communication event items; and
   performing the selected communication event.

23. The method of claim 22, wherein the communication event comprises at least one of a call transmission, a text message transmission, and an e-mail transmission.

24. A mobile communication terminal comprising:
   a storage unit configured to store a phonebook and original pictures;
   a controller configured to map an address of each member of a group to a corresponding area in an original picture selected from the original pictures and to generate a group picture by storing the selected original picture to which the group members' addresses are mapped as a group picture in the phonebook in the storage unit;
   a display unit configured to display a group picture selected from among stored group pictures; and
   a radio frequency (RF) unit configured to perform, if a predetermined area to which a group member's address is mapped is selected from the displayed group picture, a communication event with the corresponding group member.

25. The mobile communication terminal of claim 24, wherein the controller controls the display unit to display the group pictures in the form of a thumbnail image, a group name image, and an image in which a thumbnail image and the corresponding group name image are combined on a standby screen.

* * * * *